J. MOORE.
MACHINE FOR COMMINUTING BONE AND VEGETABLE MATTER.
APPLICATION FILED APR. 22, 1905.
915,460.
Patented Mar. 16, 1909.
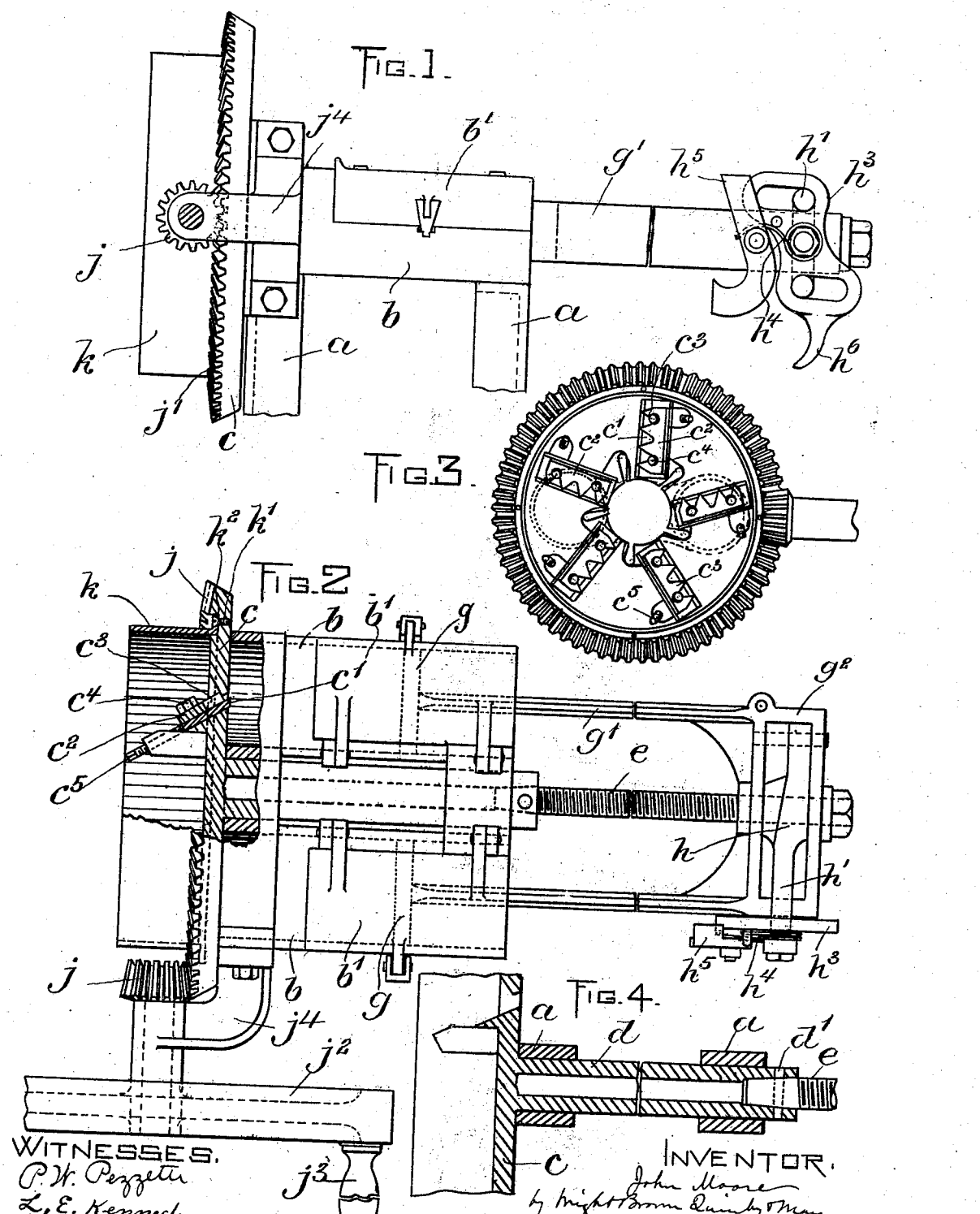

UNITED STATES PATENT OFFICE.

JOHN MOORE, OF MILFORD, MASSACHUSETTS, ASSIGNOR TO JAMES LALLY, JAMES NOLAN, JAMES M. COUGHLIN, WILLIAM C. COUGHLIN, AND MARTIN B. FOLEY, OF MILFORD, MASSACHUSETTS.

MACHINE FOR COMMINUTING BONE AND VEGETABLE MATTER.

No. 915,460.   Specification of Letters Patent.   Patented March 16, 1909.

Application filed April 22, 1905. Serial No. 256,837.

*To all whom it may concern:*

Be it known that I, JOHN MOORE, of Milford, in the county of Worcester and State of Massachusetts, have invented certain new and useful Improvements in Machines for Comminuting Bone and Vegetable Matter, of which the following is a specification.

The present invention relates to machines for cutting bone, vegetable matter, etc., and has for its object to provide a machine of the character shown in the patent granted to E. J. Roche, No. 531,426, December 25, 1894, which will be free from certain defects inherent in that machine. In the machine referred to, the cutters are mounted on a plate having gear-teeth arranged upon one face around its periphery and driven by a bevel pinion and arranged so as to lie adjacent to the reservoirs containing the material to be comminuted. With this arrangement considerable trouble has been caused by reason of bits of bone, fat, etc., getting in between the gears and clogging the spaces between the teeth.

The present invention is designed to provide a structure by which this defect may be avoided and also to provide other improved features.

The invention consists in the improvements which I will now proceed to describe and claim.

Of the accompanying drawings,—Figure 1 represents a side elevation of a portion of a machine embodying my invention. Fig. 2 represents a plan view of the same with a portion broken away and shown in section. Fig. 3 represents an end elevation as seen from the left of Fig. 1. Fig. 4 represents a longitudinal section of a portion of the cutter-sleeve, showing the method of attachment of the feed-screw thereto.

The same reference characters indicate the same parts in all the figures.

$a$ designates the supporting frame of the machine in which are mounted side by side a pair of horizontal cylinders $b$ which are adapted to contain the material to be treated, the said cylinders having hinged covers $b'$ which can be raised to admit the material. A circular disk $c$ is supported in bearings in the frame $a$ with its center located midway between the two cylinders and its body portion extending over the front ends of the cylinders. The disk carries a number of radial knives which are adjustably supported on the outer side of the disk with their cutting edges projecting through radial slots in the disk, being constructed in the same manner as are the knives described in the patent above referred to.

In the machine of the patent the cutter-disk is provided with bevel gear teeth formed on its face adjacent to the cylinders, and is driven by a bevel gear located upon the same side of the disk. With this structure it has been found practically impossible to prevent bits of the material to be ground working through the slight space that must exist between the ends of the cylinders and the face of the disk and lodging in the teeth of the gears. In order to prevent this undesirable result, I have mounted the gear-teeth $j$ of the disk, and in consequence the pinion $j'$ which meshes with the teeth and by which the disk is driven, upon the side of the disk away from the cylinders. Then in order to prevent the ground-up material which passes through the slots of the disk from falling into the teeth of the gears, I have provided a shield $k$ preferably consisting of a cylindrical flange mounted upon the face of the disk between the gear-teeth and the knives and of a length sufficient to extend over the teeth so far that the comminuted material falling from the knives cannot possibly lodge in the teeth. The shape or dimensions of the shield are immaterial, the essential features being that the shield shall occupy a position between the gear-teeth and the knives and be of sufficient length to protect the teeth.

The shield may be secured in any desired way to the cutter-disk as by means of screws $k'$ passing through lugs or a flange $k^2$ of the shield and threaded into the disk. The pinion $j$ is journaled in a bracket $j^4$ mounted on the frame and upon the shaft of the pinion is a fly-wheel $j^2$ having a crank $j^3$ by which it and the pinion may be rotated.

By means similar to that shown in a second patent to Roche No. 531,427, the material placed in the cylinders is fed toward the cutters, this means consisting of followers $g$ made to fit the bores of the cylinders, bars $g'$ connected to the followers, a cross-head or frame $g^2$, a two-part nut $h$ having arms $h'$, and a feed-screw $e$ with which the nut is engaged. The latter is released from the screw at the end of the feeding stroke of the followers by means of the cam $h^3$ with which the arms $h'$ are engaged and which is released so that the spring $h^4$ may open the nut by movement of the trip $h^5$.

After the follower has been retracted preliminary to beginning a new feeding stroke, the cam-plate $h^3$ must be manually operated in order to cause the parts of the nut to grip the feed-screw $e$. With the machines above referred to, it is difficult for this to be properly done, owing to the fact that the operator's hands become greasy and slippery from handling the material which is being cut so that it is very difficult for him to get a firm grip on the cam-plate so as to turn it. In order to remedy this defect and provide a firm holding means, I have formed upon the lower portion of the cam-plate a finger-hold or trigger $h^6$ which may be grasped by the operator to give him a positive hold. In the drawings one such projecting finger-piece is shown, but two or as many more as may be desired obviously may be provided without departing from the spirit of this invention.

Another improvement consists in the mechanism by which the feed-screw is driven. The disk $c$ is provided with an elongated hub or sleeve $d$ rigidly fastened to or formed integral with the disk and journaled in a bearing in the machine frame. To the end of this sleeve the feed-screw $e$ is connected so that the feed-screw receives its motion through the sleeve and cutter-disk from the bevel gear $j$ and crank $j^3$. In the machine of the patents referred to the screw $e$ is connected with the sleeve by a friction mechanism which permits the sleeve to slip over the end of the screw while the latter remains stationary. By this improvement, however, I have provided a structure by which such slipping is prevented. The end of the screw is rigidly and unyieldingly connected to the sleeve in which it has a tapered fit by means of a pin $d'$ passing through both the sleeve and screw. By this means a continuous positive feed is provided. The pitch of the feed-screw will be equal to the distance by which the cutter-knives project beyond the inner face of the disk $c$ so that the material may be fed to the knives as fast as it is cut up and removed by the latter.

I claim:—

1. In a machine of the character described a holder for the material to be comminuted, a disk mounted to rotate in a substantially vertical plane across the end of said holder and having a line of gear teeth adjacent its periphery, a driving gear meshing with said teeth, cutters carried by the disk within the line of teeth, and an annular shield between the cutters and teeth extending laterally beyond the vertical plane of the said teeth and driving gear, permitting discharge of the cut material and preventing the same from falling upon the teeth or driving gear.

2. In a machine of the character described, the combinaton of a holder for the material, a rotary disk working across the said holder in a vertical plane, cutters carried by the disk, bevel gear teeth formed on the disk adjacent its periphery and located on the opposite side of the disk from the holder, a bevel gear in mesh with said teeth for rotating the disk, and a flange mounted on the side of the disk between the cutters and gear-teeth and projecting laterally beyond the teeth and gear for guarding against discharge of the cut material into the teeth.

In testimony whereof I have affixed my signature, in presence of two witnesses.

JOHN MOORE.

Witnesses:
J. C. LYNCH,
PATRICK W. LALLY.